United States Patent [19]

Disbrow et al.

[11] Patent Number: 4,470,129
[45] Date of Patent: Sep. 4, 1984

[54] PAGE MODIFICATION METHOD IN A PRINTER SUBSYSTEM OF THE PARTIAL PAGE BUFFER COMPOSING TYPE

[75] Inventors: John R. Disbrow; Everett T. Eiselen, both of Los Gatos, Calif.; Gerald I. Findley, Tucson, Ariz.; Stephen G. Luning; David T. Wang, both of San Jose, Calif.

[73] Assignee: International Business Machines Corporation, Armonk, N.Y.

[21] Appl. No.: 345,943

[22] PCT Filed: Oct. 14, 1981

[86] PCT No.: PCT/US81/01380
§ 371 Date: Jan. 29, 1982
§ 102(e) Date: Jan. 29, 1982

[87] PCT Pub. No.: WO83/01521
PCT Pub. Date: Apr. 28, 1983

[51] Int. Cl.³ .............................................. G06F 3/12
[52] U.S. Cl. .................................................... 364/900
[58] Field of Search ... 364/200 MS File, 900 MS File, 364/300

[56] References Cited

U.S. PATENT DOCUMENTS 3,959,776  5/1976  Morley ............................... 364/900
4,031,519  6/1977  Findley ............................... 364/900
4,300,206 11/1981  Belleson et al. ...................... 364/900

Primary Examiner—Raulfe B. Zache
Attorney, Agent, or Firm—R. Bruce Brodie

[57] ABSTRACT

A page modification method in a printer sybsystem of the partial page buffer composing type. A printer subsystem receives a packet containing a page of characters, coded overlays/elisions, and combining data from an external source. The packet is translated into a linked list of character placement representations for each of the doubly indexed coded characters within the page. Elisions from the page are made by inhibiting the formation of a linked list segment for each character sequence within elision markers set out in the page. In contrast, coded character overlays are appended to the list as addenda. The list governs the placement of characters into a partial page buffer, whose contents are system accessible in row major order.

4 Claims, 2 Drawing Figures

PAGE MODIFICATION METHOD IN A PRINTER SUBSYSTEM OF THE PARTIAL PAGE BUFFER COMPOSING TYPE

FIELD OF THE INVENTION

This invention relates to page modification methods for use in a printer subsystem making detectably dissimilar variations of a base page.

BACKGROUND ART

Morley, U.S. Pat. No. 3,959,776, issued May 25, 1976, disclosed a method and apparatus for printing locally stored formatted messages in which fetch commands were embedded in the format. Upon a given format being selected, the embedded commands were excised therefrom and executed against a stream of external supplied variable characters, which characters were then inserted within a message prior to printing.

Line-at-a-time printers are exemplified by Findley, U.S. Pat. No. 4,031,519, issued June 21, 1977 in which copies of a formatted page are modified by way of pre-stored character additions and deletions locally within the printer. More particularly, characters assembled into a page within a whole page buffer can be repeatedly used to print the same page with slight changes in the different copies. Modification data is externally transmitted to the printer and buffer stored. As each line of the printer is readied for entry into the printing cycle, parts of the modification data indicating the copy number, line number, and print position of changes to be made are compared with the printer counterpart data. Changes are made where necessary by using new data from the modification data to replace the old data in the line to be printed. New data may include one or more blank characters. Blank characters are used to suppress data in the corresponding parts of the line to be printed.

Belleson et al, U.S. Pat. No. 4,300,206, "Flexible Test and Image Generator for a Raster Printer", issued Nov. 10, 1981, discloses a scrolling buffer of less than full page capacity into which doubly indexed characters are written in print serial order. A print read head is also depicted which asynchronously accesses the buffered characters at addresses suitably off set, also in print serial order, for imprinting on an advanceable print paper medium.

Many printers use a page size buffer within which they electronically assemble the characters which are subsequently read out by a print read head. Under these circumstances, it is not material in what arbitrary sequence the indexed characters are applied to the buffer. Since the buffer is usually a full page all points addressable RAM, the indices defining row and column starting address positions can be immediately used to write the character raster pattern into the buffer. However, where the buffer is constrained to substantially less than full page capacity, then a scrolling mode of writing into and reading the characters from the buffer must be used. To write into a scrolling buffer requires creation of a sorted order of characters prior to the writing.

As is also known from the Belleson patent, fonts of characters as raster subarrays are locally stored at the printer. A character sequence from a remote source to the printer subsystem includes indication of the font and a succession of code points corresponding to the characters. The data construct used by Belleson to represent this sorted order prior to buffer writing is a pair of linked lists. Indeed, the method for sorting an arbitrary sequence of doubly indexed characters into print serial order and for writing said sorted sequence into a buffer of less than full page capacity is the subject of a copending divisional application U.S. Ser. No. 06/241,321, filed Mar. 6, 1981 of the now issued Belleson patent.

The character received by the printing subsystem can be in the form of a code point and an ordered pair of numbers (indices) connoting row and column positions on a page. Writing of a character is generally the process of fetching a counterpart raster pattern from a local font store and writing it into a designated location defined by the indices within the buffer. These aspects are described more fully in the following portions of the specification or with reference to the Belleson patent and copending divisional application.

According to Belleson, the aforementioned linked lists are formed from sorting the received characters at the printing subsystem into groups according to their row index and then forming a threaded list of the characters in each group according to their column position. Print serial order is then represented by traversing the sequence defined by the lists.

THE INVENTION

The technical problem solved by this invention is the generation of distinct versions of a common (base) page of characters by amending the base page according to predesignated overlays and/or elisions. Each version (copy group) may use some or none of the overlays and elisions (character suppressions) specified for other versions or copy groups. The general inventive thought is that the amendatory information can be translated into addenda to the linked lists defining the page and processed in the same manner as heretofore shown in the art.

More particularly, the invention is directed to a method for page modification in a printer subsystem of the partial page composing type to which is applied a stream of characters consisting of a formatted page, a set of overlays, and a copy control segment. The overlay set includes overlays consisting of coded characters to be selectively added to a base page. A base page may contain strings of coded characters delimited by suppresssion identifiers for selectively deleting characters from the base page. Each copy control segment defines copy groups and a concordance of copy group, including number of copies, overlay set and suppression set. A core page is a reduced base page, i.e., base page absent overlays and suppressible data.

The method steps of the invention comprise (a) forming a linked list of character placement on the core page as the character stream is applied to the printer externally; (b) duplicating a preselected portion of the linked list for each copy group defined by the copy control segment; (c) forming a linked list addendum for each copy group of its counterpart set of character additions and suppressions; and (d) executing the linked list and the addenda in the printer subsystem, said executing step, includes the steps of placing characters in a buffer in the position and order determined by the linked list whereby the partially composed page is available for print serial reading.

The linked list is formed from the random arrival double indexed characters, and which comprises a scan table and a character table. However, only the scan table (row index of character placement) is duplicated. Also, the base page includes marks bounding each excisable character stream while the copy control segment includes counterpart identifiers.

The printer subsystem receives a stream of characters and embedded controls from a CPU driven channel illustratively formatted as follows: BO1(BEGIN OVERLAY 1), WT(WRITE TEXT), ..., EP(END PAGE); ... BO2, WT, ..., EP; LCC(LOAD COPY CONTROL); BP(BEGIN PAGE), WT, ... EP. The coded overlays (BO ... EP) are each defined in the character stream prior to the base page (BP ... EP). The embedded controls and parameters found in LCC correlate each base page and copy group with a counterpart set of overlays and suppressions. The LCC parameters are applied to each following base page until the LCC is replaced. Illustratively, each base page may have a copy group of 50 copies of the base page with no changes, a second copy group of 1,000 copies with overlay number 1, a third copy group of 500 copies with overlay number 2 and suppression 5. While the overlays are defined prior to the base page, character suppression requires marks bounding each excisable character stream in each base page. Likewise, the suppression marks are paired with identifiers in the LCC.

Where a page is being modified by suppression, the method steps include (1) at base page time, suppressing all fields to form the core page; and (2) at end page time, selectively restoring suppressed data not named in the counterpart copy group being executed.

DESCRIPTION OF THE PREFERRED EMBODIMENT AND INDUSTRIAL APPLICABILITY

Figure 1:
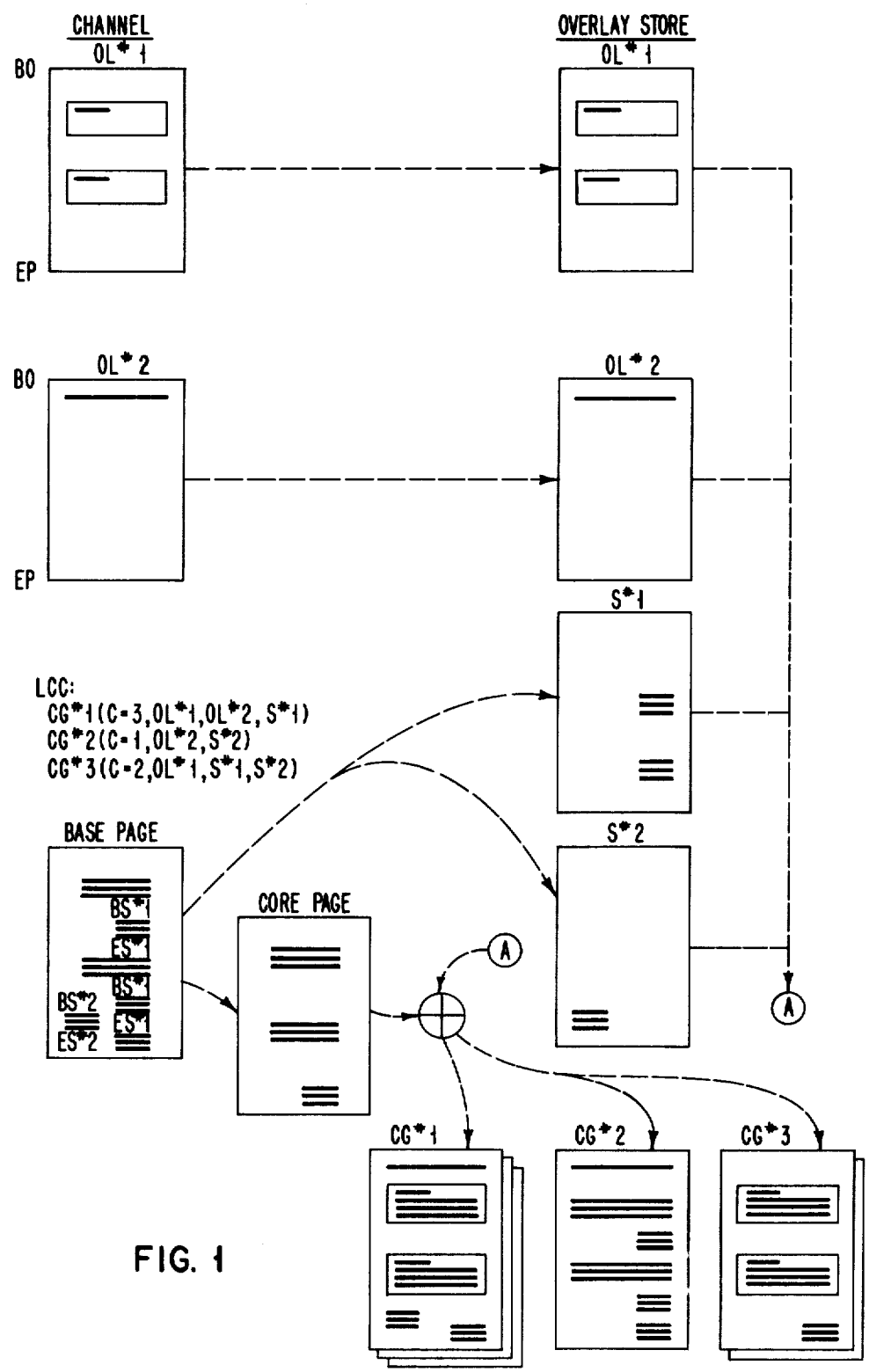
FIG. 1 depicts the relation among copy groups, base and core pages, and overlays.

Aspects of Partial Page Composing for a Raster Printer

The co-pending Belleson patent applications describe a machine implementable method for composing a partial page during a portion of a raster page printing cycle. During page composing, a linked list representation of the placement position of each character as received from a channel is formed. That is, each character and its attributes, such as size, font, orientation, and position order is examined as part of its input processing. As each new font is encountered, counterpart raster subarray dot patterns are obtained from local memory. These raster dot patterns are written into a RAM type raster pattern memory (RPM). As each test character is encountered, an entry is made into the linked list preserving the position and identity of the character in the electronic page. After the list has been compiled, its contents are used to control the movement of selected subarrays from the RPM for placement, a full subarray at a time, into a partial page buffer. The reading and writing of information into the partial page buffer is managed asynchronously. Signficantly, the reading of data from the partial page buffer is sequential in consecutive raster scan lines. The asynchronism is described in Yu, Vol. 23 of the IBM Technical Disclosure Bulletin at page 1217, published in August, 1980. The Yu method for managing overrun and partial page buffers is to detect a displacement between READ and WRITE counters less than a predetermined magnitude and providing signal indication when there exists insufficient room to write within a submatrix thereby avoiding overrun and decreasing collision probability.

The Belleson printer subsystem assures that raster patterns will be handled in starting scan line sequence when the page is being printed. Flexibility of the technique used, makes it a matter of total indifference as to the arrival order of the characters. The printer control makes use of linked lists with one list for each scan line on the page. The collection of list heads is called a scan table. The list head for each scan line points to one of two places. It can point to the list head for the next scan line if there are no raster patterns to be printed starting on that scan line, or it can point to a table entry for the most recently received pattern to start on that scan line. This second table is called the character table. It contains an entry for each character to be printed on a page ordered in the sequence the characters were received by the printer. The scan table is modified and character table is added to the printer subsystem as each page character is received.

The entries in the character table contain the following information. The position of the characters along the scan line is defined by the starting pel, the size of the character is defined by the number of scans and by a pel count, the address of the graphic character pattern is provided by a raster pattern memory address, another link points to the entry/or the next pattern starting on that scan line to be printed. The results of the page preparation process are linked within a list which permit all of the characters on the page to be processed by writing into a partial page composing buffer and reading therefrom in raster scan line sequence.

Character Streams and Embedded Controls

Typically, a CPU communicates with a printer subsystem by a sequence of commands, contained in channel command words (CCWs), and data. Descriptions of such a system may be found in Amdahl, U.S. Pat. No. 3,226,689, and the aforementioned Findley patent and Belleson U.S. Pat. No. 4,300,206 and the copending divisional of Belleson. Other patents describing attachment architecture may be found in Clark, U.S. Pat. No. 3,725,864, relating to input/output control and Beausoleil, U.S. Pat. No. 3,336,582. In substance, a CPU's relationship to a printer begins when the CPU invokes a START I/O instruction. This instruction serves to establish a connection between the CPU and the addressed printer and leads to the execution of a series of channel commands within the printer. The invocation of the START I/O instruction causes control to be relinquished to a series of CCWs. The command portion of the CCWs is, in turn, sent over the channel to the printer subsystem. For the most part, pages are composed using multiple channel commands. The LOAD PAGE DESCRIPTION command provides initial conditions used on each succeeding page. LOAD COPY CONTROL (LCC) CCW causes each subsequent page transmission to result in the printing of a specified number of copies. The copies are in groups of identical pages. Text data is transmitted by a succession of WRITE TEXT (WT) commands. Each WRITE TEXT command can transmit up to the printer's buffer maximum of text data and embedded control codes. Additional control commands are needed for page printing. These include BEGIN PAGE (BP) and END PAGE (EP) for marking the initiation and termination of each page of characters.

The CPU, by way of appropriate CCW sequence, communicates both pages and page overlays to the printer subsystem. This includes initialization information and the text for each page to be printed. Such a sequence otherwise described in Belleson, et al., includes in the initialization phase, a LCC, BP, WT, ..., WT, WT, ... EP. The LCC includes the parameters defining each version of the base page including the quantity, set of overlays, and suppressions. BP and EP are page delimiters.

In the invention, the event sequence includes the sending of overlay pages, the LCC, and the base page which includes the suppression information. This sequence augments the previous base page only transmission since it requires BEGIN OVERLAY, BEGIN SUPPRESSION, and END SUPPRESSION delimiters. Symbolically, the sequence can be represented by BO1, ..., WT, ..., EP; BO2, ... WT, ... EP; LCC; BP: ... text ... BS1 ... text ... ES1 ... text ... BS2 ... text ... ES2 ... text ... BS1 ... text ... ES1 ... text ... EP. The delimiters BS, ES, are examples of embedded controls. Other embedded controls can be used to move the current print position, change font or to draw rules. The write commands are used to construct a logical page of test. A WT CCW transmits a data record of one or more bytes. The text data record can consist of any string of multiple bit byte characters. Significantly, a write text command may end in the middle of an embedded control sequence. Each character in a string of write text data normally causes a character pattern to be placed on the page and the column coordinate of the current print position to be increased.

Begin Suppression (BS) and End Suppression (ES) controls together with the suppression numbers in the LCC command provide a text deletion capability similar to that described in the Findley patent. Print suppression occurs when the BS parameter matches a print suppression number that has been selected in the LCC command. From a BS control whose number is selected in LCC to the matching ES, no text characters or rules are printed. However, the current print position is incremented just as though printing were taking place. The BS control may be embedded. Its range of effect extends from its location in the text stream to the location of the matching ES. A nesting of BS-ES pairs is not permitted. That is, following a BS control, there may not be any other BS or ES control preceding its terminating ES.

The BP and EP CCWs mark the beginning and end of each page of data. The LCC is used to establish how many copies are to be printed of succeeding pages of the data set. The BP CCW is issued at the beginning of each page and causes the printer to change from a default reference state to a page composing state. Likewise, the EP CCW marks the end of a page overlay as well as that of a page. It causes the printer subsystem to return to its reference state.

The BO (BEGIN PAGE OVERLAY) CCW initiates a page of data which is not to be printed but is to be stored within the printer subsystem as a page overlay. The overlay is later to be merged with ordinary printed pages using the overlay parameter of the LCC. This provides a substitute for the preprinting on preprinted forms. In this regard, a page overlay transmission starts with the BO CCW which causes the printer subsystem to shift from its reference state to an overlay state. As indicated above, the transmission may continue with one or more write type commands and terminate with an EP CCW.

The LCC CCW transmits a variable length record defining groups of identical copies. With one page transmission, several differently modified groups of identical copies can be made. As mentioned before, a LCC CCW causes each subsequent page transmission to result in the printing by the printing subsystem of the specified number of copies. The copies are in groups of identical pages. Each group being modified as specified in the LCC command.

Relations Among Copy Groups, Base and Core Pages, and Overlays

Referring now to FIG. 1, there is shown in top to bottom order of transmission, the overlay pages, the LCC, and the base page. The bold, horizontal lines in this figure represent lines of text. The overlay pages are stored in the printer subsystem overlay store. The base page, however, is operated upon so as to excise the text between the BS and ES controls which is stored separately in the overlay store as a suppression. The base page, less its suppressed materials, is called a core page.

As previously mentioned, the LCC defines the copy groups. In the example shown in FIG. 1, there are three copy groups denominated CG1, CG2, and CG3. CG1 consists of three copies, i.e., C=3. The base page is to be modified with both overlays and one suppression. In contrast, copy group 2 consists of only one copy and overlay number 2 and suppression number 2. Lastly, copy group 3 consists of two copies and one overlay, and both suppressions. Note that overlay 1 has two blocked areas, each with a line of text used for a heading. Overlay 2 consists of a line of text running the width of the page. Two groups of text lines on the right side of the page are denoted by suppression 1, while suppression 2 includes a single set of text lines on the lower page left.

Inspection should reveal that each of the copy groups consists of an ORing of the designated overlays and the suppressions not selected in the LCC. For example, copy group 1 calls for both overlays. Since the core page has three groups of text lines, and overlay 1 consists of two bordered areas, then copy group 1 includes two of the core page text groups within the bordered areas as well as the text block in the lower right hand corner plus the horizontal top page text required by overlay 2. The first copy group requires suppression 1. It should be observed that the base page has three blocks of short text lines on the right side. The two delimited by suppression 1 are indeed suppressed. The third, unmarked block is present, as is the block in the lower left corner delimited by suppression 2, which is not selected in the first copy group. A similar analysis can be made for the remaining copy groups.

Formation of a Linked List for Placing Characters on a Composed Page

As articulated in Belleson co-pending applications with reference to FIGS. 8 through 10, 16a-c, 17a-f, there is described a method for partially composing a formatted page in a buffer of less than page capacity responsive to the random arrival order of doubly indexed characters. The characters are sorted into groups according to a first index. A threaded linked list of characters in each group is formed based on their order of arrival. The characters are then written into a buffer in the row position designated by the first index and the column position determined by the contents of the threaded linked list. In Belleson, the first index used with a "scan table" defined as a set of ordered entries. The position, or order, of the entry in the table is the raster scan line number, while the contents of the entry is the next item to be considered for buffer loading from a print time perspective. The threaded linked list is called a "character table" or a "pattern address table". All of the characters belonging to a group counterpart to a scan table entry are ordered according to the linking, which is determined by the arrival sequence. The character table entry consists of a character pattern address, the size of the pattern, its page location according to the second index, together with a pointer to the next entry in the linked list. A current entry register defining the current entry in the character table is used interactively with a scan table.

It should be appreciated that characters arrive in the stream in random arrival order. It is the aim of the table building operation to place such random arrival order of characters in a print serial order. This is brought about by the following method steps: (1) scanning the character stream in order to identify WT commands and the page coordinate (x,y location) of the first character of the accompanying character string, the ordinal (y) location defining the scan table entry; (2) place the contents of the scan table entry in the pointer field of the character table location called out by the current entry register, then place the contents of the current entry register into the scan table entry; (3) placing the column location of the character, corresponding to the x coordinate of the character, into the current character table entry; (4) move the character pattern address and the size of the character pattern from the font index into the current character table entry; (5) updating the contents of the CER by unity and increment the current print position.

The second step in the table building operation is a link building operation. Furthermore, the building of linked lists is not a sorting operation as such. Rather, it permits list following while executing (printing), to print as a group all characters starting at the same ordinal (scan) print position.

Linked List Addendum Formation

Figure 2:
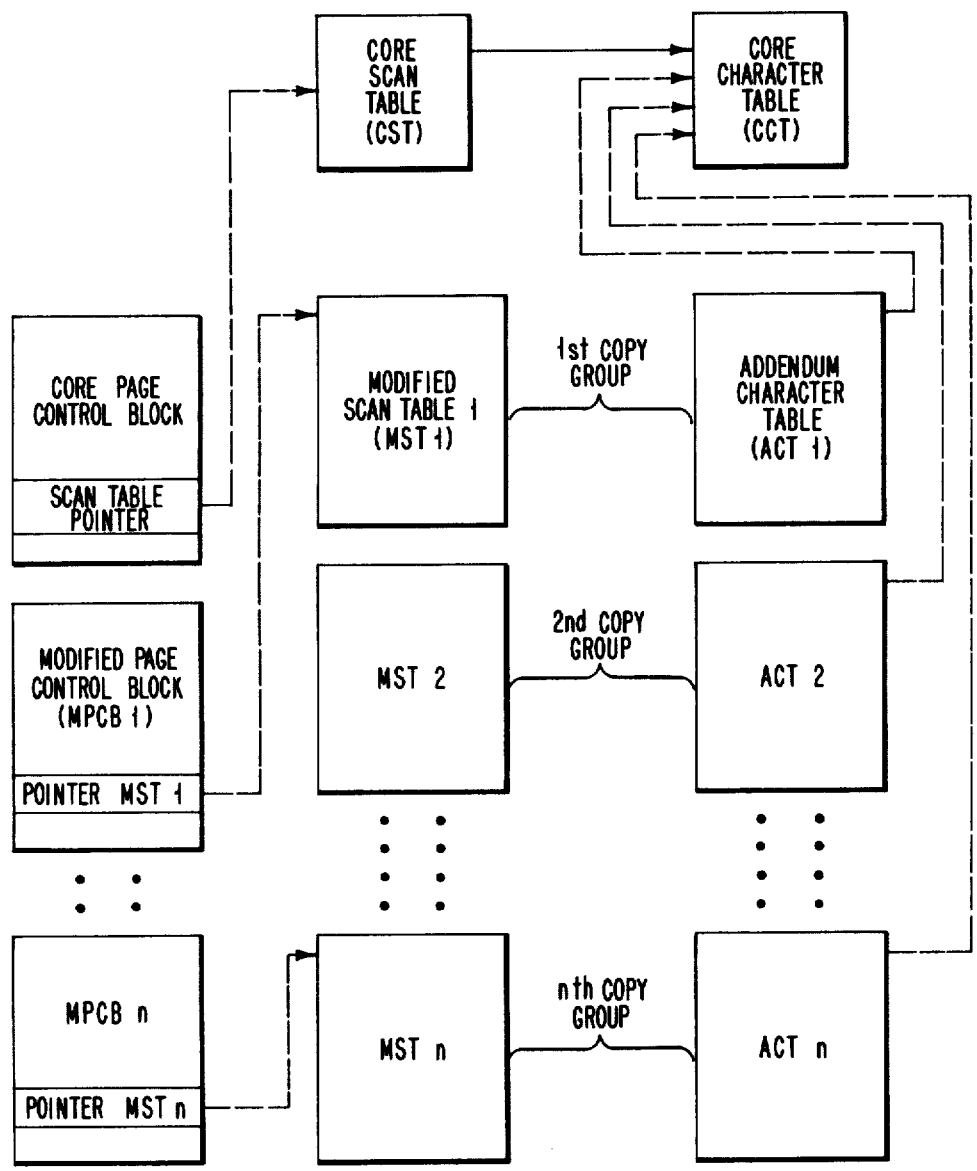
FIG. 2 depicts for each copy group the linked list addenda to the list defining the core page.

Referring now to FIG. 2, there is shown the relation among the addenda and the core page for the various copy groups. As should be appreciated from the discussion in respect of FIG. 1, the "base page" stripped of its characters to be suppressed is termed a "core page". The modified scan table and the addendum to be added to the core character table for each copy group is formed from the overlay set and the suppression set defined by the copy groups in the LOAD COPY CONTROL.

The execution of LOAD COPY CONTROL CCW functionally deletes the old copy control block (CCB), overlay list and suppression list. Further, it creates a new CCB with its own overlay list and suppression list. Lastly, the LCC sets the current CCB pointer.

When a BP is detected, the printer subsystem allocates a core page control block (CPCB), sets a PCB pointer to CPCD, checks for the existence of a CCB. Upon a WT being detected, the printer subsystem first builds a core scan table and core character table. The tables were summarily described herein before and are set out in detail in the aforementioned Belleson patent. Referring to FIG. 2, the core page control block (CPCB) contains a scan table pointer. These pointers are actually to reserve memory areas which may be reassigned after counterpart activities have been completed.

Referring again to FIG. 2, the overlays and suppression set defined by the copy group in the LCC are built as a two table list and added to the BST and BCT. There need be only one copy of the BCT.

When the system detects an EP channel command, the overlays and suppression set defined for each copy group in the LCC are built as a two table list. The process starts by copying the core page scan table. As the building process proceeds, this copy of the scan table is modified and the addendum character table for this group is built. The building process is the same as described above except the input data comes from the overlay store instead of from the channel buffer. First, all the overlays specified in the LCC are processed, then all the suppressions *not* specified in LCC are processed. After the addendum character table has been completed, the copy group is ready for printing using the modified scan table and the addendum character table for that group plus the core page character table. The core page scan table is no longer needed after the building process for the last copy group has been started.

The Management of Suppression

Suppressions are defined as variable data to appear on some copies, but not on others. An example would be prices that might appear on some copies of an invoice, but not appear on other copies. Therefore, suppressions are part of the variable data and are transmitted as part of the base page. They are delimited in the text stream for possible elision. As the base page is received by the printer all suppressible data is saved in the overlay store. Then, when the formatted page is completed, EP time, all suppressions not selected in LCC for that group can be added back to the core page to achieve the effect of suppressing the selected passages. Thus a process of selective subtraction is concverted into a process of mass subtraction then selective addition to the common core.

The suppression data can be added to the overlay store because no overlays can be added to it in the middle of a base page, between BP and EP. The need for the suppression data persists only until the completion of processing of EP, at which time all the suppressible data is deleted from the overlay store so the store's state is the same as it was at the BP for the base page.

The foregoing has described the method of this invention and its concrete implementation. It is an aspect that the core character table need not be replicated for each copy group because any entry in the character table only points to another entry which is "higher up" in the character table. Consequently, each copy group need construct only the addendum to the character table.

It is the fan-in characteristic of the character table that is being relied upon to form a page for each copy group from the base character table and the modified character table where the base character table is referenced and not replicated.

It is to be understood that a particular embodiment of the invention described above is merely illustrative and not restrictive of the broad invention. Various changes in the design, structure and arrangement may be made without departure from the spirit of the broader aspects of the invention as defined in the appended claims.

We claim:

1. A method for page modification and copy group control in a system for printing text in raster form on a print medium, said system including means for storing fonts of character raster patterns, a buffer of less than page capacity into which selected patterns may be written, and control means coupling the storage means and buffer for interpreting information applied to the system, arbitrary sequence characters are mapped into a linked list of character placement representation of a page of coded characters, said list operatively controlling the buffer character fill operations, the characters being buffer accessible to the system in row major order, characterized by the steps of:

applying a character stream formatted to include a set of overlays and a copy control segment to the control means, said overlay set consisting of characters to be selectively added to the page, each segment defining copy groups and a concordance of the page, copy group, and overlay subset;

duplicating a portion of the linked list for each copy group defined by the segment;

forming a linked list addendum for each copy group of its counterpart overlay subset; and filling the buffer in the position and order governed by the list and counterpart addendum as each copy group is processed by the control means.

2. A method for page modification in a printer subsystem of the partial page buffer composing type to which is applied a stream of characters characterized by the steps of:

applying to the subsystem a character stream consisting of a formatted page, a set of overlays, and a copy control segment, the overlay set includes overlays consisting wholly of coded characters to be selectively added to the formatted page, the formatted page having marks bounding each excisable character string therein, each segment further defining copy groups, counterpart identifiers to the formatted page marks, and a concordance of the page, copy group, and overlay subset;

forming a linked list character placement representation of the formatted page;

duplicating a preselected portion of the linked list for each copy group defined by the copy control segment;

forming a linked list addendum for each copy group of its counterpart subset of overlays;

processing the formatted page linked list for excising therefrom the mark bounded character strings; and filling the partial base page buffer with characters according to the processed linked list and the addenda in the copy group order set out in the copy control segment.

3. In the system for printing text in raster form on a print medium, said system including means for storing fonts of character raster patterns, a buffer of less than page capacity into which selective patterns may be written, and control means coupling the storage means and buffer for interpreting information applied to the system, a method for the sorting of a page of arbitrarily sequnced doubly indexed characters together with any page amendments into print serial order and for writing the raster patterns of the sorted sequence into the buffer, the indicies of a character defining its counterpart row and column page position, said sorted sequence being written into the buffer so as to permit asynchronous scrollable reading thereof, the sorted sequence being represented by a linked list, traversal of the list controlling the bufferwriting, comprising the steps of:

applying a sequence of characters to the control unit, said character sequence including a full page of characters, coded overlays and elisions, and combining data;

translating the sequence according to the combining data into a linked list print serial character sequence page representation in which elided characters are omitted and overlay character sequences are mapped into a linked list addendum; and writing the raster patterns of the characters into the buffer upon traversal of the amended list and the addendum by the control means.

4. A method according to claim 3, wherein each doubly indexed character comprises a code point and indices, the code point being interpreted by the control means upon traversing the linked list in order to access a counterpart subarray and subsequent writing thereof into the buffer at a starting address defined by the indices.

* * * * *